United States Patent [19]

Regensburger

[11] 4,257,307
[45] Mar. 24, 1981

[54] HOLE-DRILLING SELF-TAPPING SCREW

[75] Inventor: Werner Regensburger, Widnau, Switzerland

[73] Assignee: SFS Stadler AG, Mauren, Liechtenstein

[21] Appl. No.: 870,194

[22] Filed: Jan. 17, 1978

[30] Foreign Application Priority Data

Jan. 19, 1977 [AT] Austria .................................. 304/77

[51] Int. Cl.³ .......................................... F16B 25/00
[52] U.S. Cl. .................................. 411/387; 408/228; 408/231
[58] Field of Search ........................... 85/41, 1 P, 68; 408/199, 226, 227, 213, 232, 231, 228; 10/140

[56] References Cited

U.S. PATENT DOCUMENTS

| 1,104,987 | 7/1914 | Grimes | 408/232 |
| 1,327,566 | 1/1920 | Morris | 408/232 |
| 2,266,892 | 12/1941 | Mullen | 85/9 R |
| 2,364,733 | 12/1944 | McCollum | 85/41 |
| 2,627,292 | 2/1953 | Kronwall | 408/213 |
| 3,699,841 | 10/1972 | Lanius | 85/41 |
| 3,715,952 | 2/1973 | Fischer | 85/68 |
| 3,718,067 | 2/1973 | Fischer | 85/68 |
| 3,924,508 | 12/1975 | De Caro | 85/41 |
| 4,016,795 | 4/1977 | Gill | 85/41 |
| 4,022,099 | 5/1977 | Ballantyne | 85/1 P |

FOREIGN PATENT DOCUMENTS

| 2422452 | 11/1975 | Fed. Rep. of Germany | 408/227 |
| 2549147 | 5/1977 | Fed. Rep. of Germany | 85/41 |
| 1330536 | 8/1962 | France | 408/227 |
| 690269 | 4/1953 | United Kingdom | 85/41 |

Primary Examiner—Rodney H. Bonck
Attorney, Agent, or Firm—Toren, McGeady and Stanger

[57] ABSTRACT

A self-tapping screw whose stainless steel shank has a slotted free end in which a plate-shaped, carbide drill bit is fastened, the bit being dimensioned and arranged to drill a hole smaller than the major diameter of the tapping threads.

15 Claims, 17 Drawing Figures

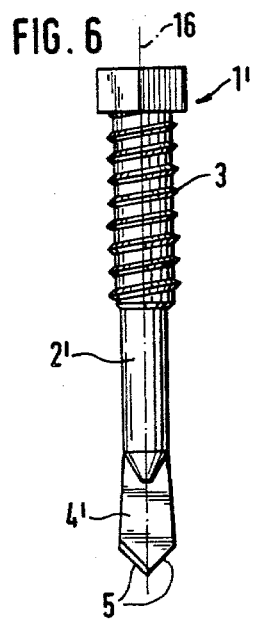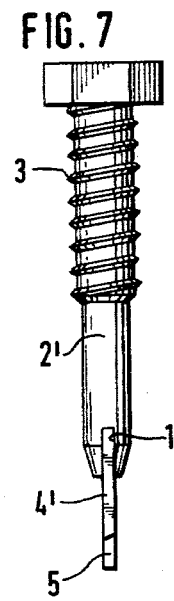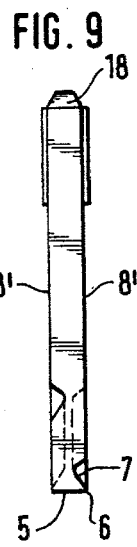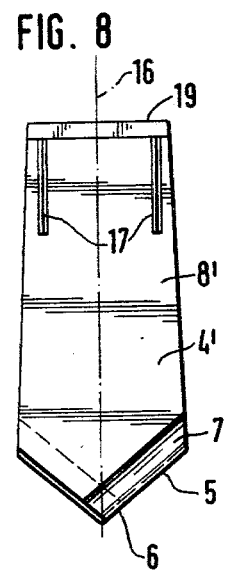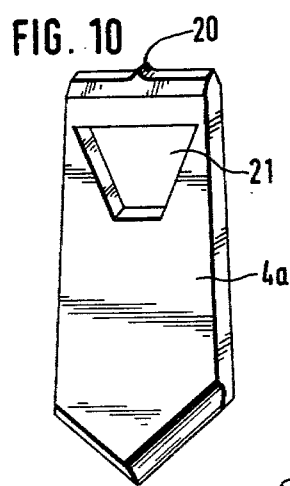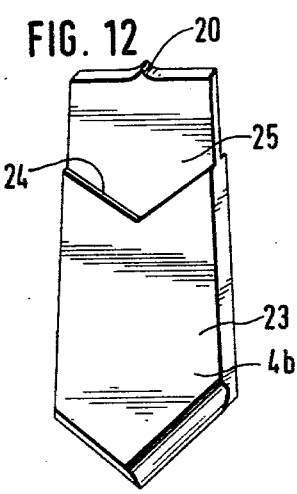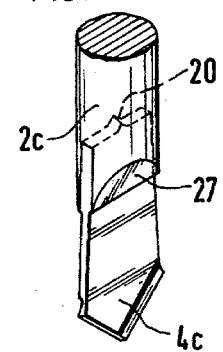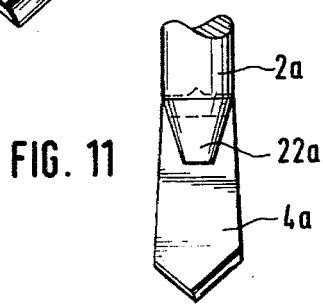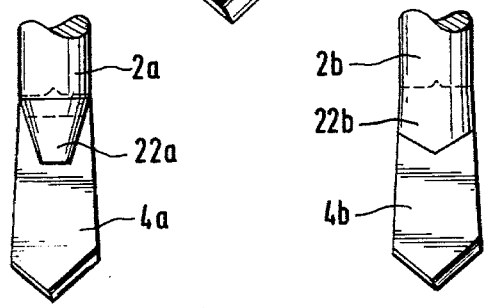

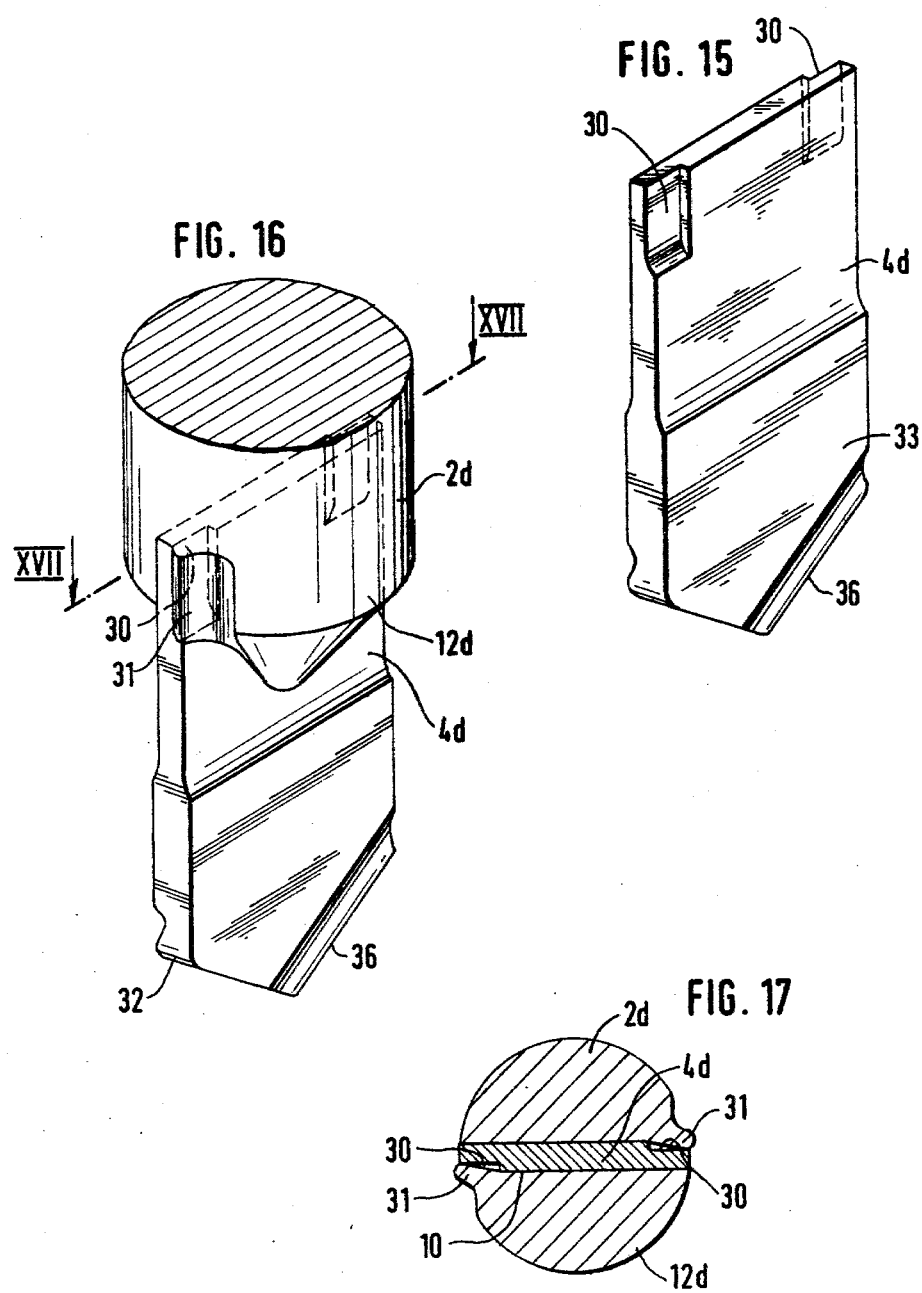

HOLE-DRILLING SELF-TAPPING SCREW

This invention relates to self-tapping screws, and particularly to a hole-drilling self-tapping screw which is capable of drilling a hole in a metal object when rotated about its axis, the wall of the hole then being threaded by engagement with the threads of the screw during rotary movement of the latter.

Known screws of the type described require complex and costly manufacturing procedures and are subject to structural failure in the event of even minor deviations from exacting specifications. Other known, hole-drilling and self-tapping screws are suitable only for work on relatively soft substrates and cannot be used for fastening metallic objects.

It is a primary object of this invention to provide a hole-drilling self-tapping screw which is of simple and structure, accordingly is inexpensive to manufacture, yet effective for firmly anchoring itself in metal objects.

According to this invention, the screw has an elongated, threaded shank and a head, or its equivalent, on one axial end portion of the shank which permits the shank to be turned about its longitudinal axis. The other axial end portion of the shank is formed with an axially open slot in which a portion of a cutting member is fixedly secured as a drill bit. The cutting member, which consists of a material harder than that of the shank projects from the slot in a radial direction and axially away from the head. When the shank is rotated about its axis, the cutting member defines a surface of circular cross section whose maximum diameter is smaller than the maximum major diameter of the threads on the shank.

Other features, additional objects, and many of the attendant advantages of this invention will readily be appreciated as the same becomes better understood by reference to the following detailed description of preferred embodiments when considered in connection with the appended drawing in which:

FIGS. 6 and 7 show a modified screw of the invention in front and side elevation respectively;

FIGS. 8 and 9 respectively illustrate the drill bit of the screw of FIGS. 6 and 7 in front and side elevation on a larger scale;

FIG. 10 shows another drill bit of the invention in front elevation;

FIG. 11 is a fragmentary, front-elevational view of a screw including the drill bit of FIG. 10 on a reduced scale;

FIGS. 12 and 13 show another drill bit and corresponding screw in the manner of FIGS. 10 and 11;

FIG. 14 illustrates yet another screw of the invention in a perspective view and partly in plan section;

FIG. 15 is a perspective, enlarged view of yet another drill bit of the invention;

FIG. 16 shows a screw including the bit of FIG. 16 in a fragmentary, perspective view; and FIG. 17 illustrates the drill bit of FIG. 16 in plan section on the line XVII—XVII.

Figure 1:
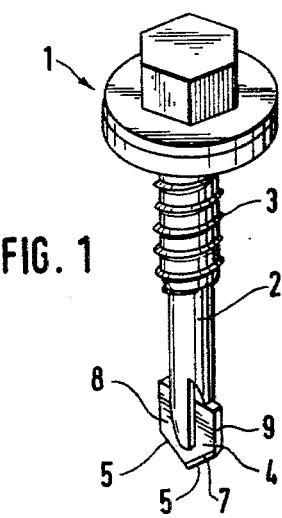
FIG. 1 is a perspective view of a screw of the invention.
Figure 2:
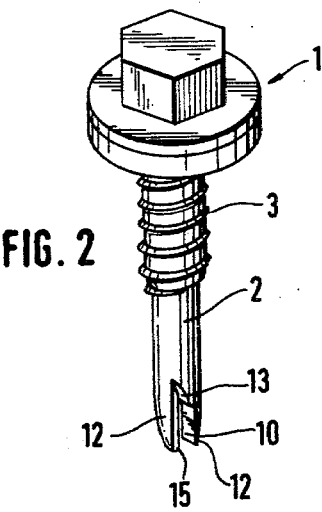
FIG. 2 shows the screw of FIG. 1 without its drill bit.
Figure 3:
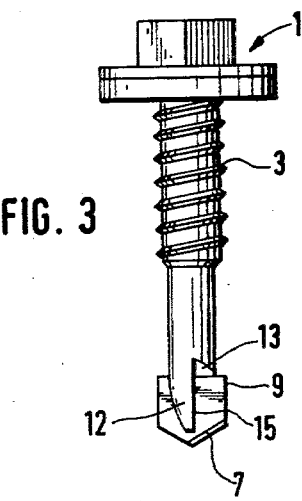
FIG. 3 is a front-elevational view of the same screw.
Figure 4:
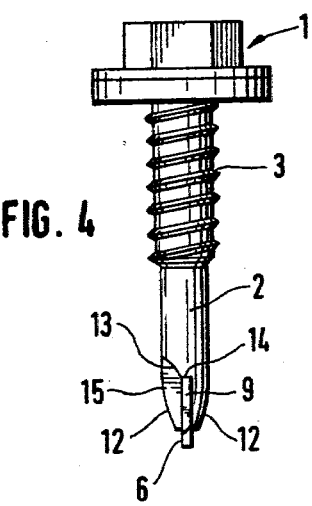
FIG. 4 shows the screw in side elevation.
Figure 5:
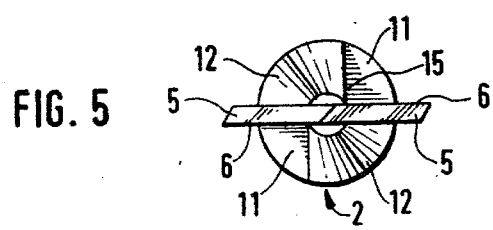
FIG. 5 is a bottom plan view of the screw of FIGS. 1 to 4 on a larger scale.

Referring initially to FIGS. 1 and 5, there is seen a screw whose hexagonal head 1, shank 2, and cutting threads 3 consist of stainless steel. A cutting bit 4, which is a small plate of tungsten carbide, projects axially and in two opposite radial directions from the free axial end of the shank 2. The axially terminal, free, narrow face of the bit 4 has two straight sections 5 which converge at an obtuse angle in a short drilling edge near the axis of the screw and are each obliquely inclined relative to respective wide parallel, axial faces 8 of the bit to form a cutting edge 6 directed counterclockwise in the view of FIG. 5. The angle of intersection of the faces 5, 8 at each cutting edge 6 is made more acute by a groove 7 in each face 8 contiguously adjacent the edge 6. The groove 7 is elongated and parallel to the associated face section 5 as is best seen in FIGS. 9 and 10 which illustrate an otherwise modified bit. The narrow axial faces 9 which connect the faces 8 are obliquely inclined relative to the wide faces for better reaming action.

A portion of the bit 4 is received in a diametrically and axially open slot 10 in the tapering free end of the shank 2 which is split by the slot into two branches 12. Each branch is formed with a radially and axially open recess 11 communicating with the slot 10 in one circumferential direction and bounded in the other circumferential direction by a flat, axial face 15 of the branch perpendicular to the wide face 8 of the bit which terminates in the cutting edge 6. The recess 11, which extends less than 90° about the axis of the screw thus provides necessary clearance for chips drilled from a substrate by the bit 4 without impairing the backing of the bit by the branch 12. Then recess 11 is bounded in an axial direction toward the head 1 by a flat face 13 of the shank sloping obliquely outward from the narrow bottom wall 14 of the slot 10 away from the cutting edges 6.

An axial portion of the shank 2 between the slot 10 and the threads 3 is smoothly cylindrical and smaller in diameter than the corresponding dimension of the bit 4, also smaller than the maximum major diameter of the threads 3 which in turn extend farther from the screw axis than the greatest radial spacing of any portion of the bit 4 at right angles from the same axis. The surface of circular cross section defined by the rotating bit 4 thus has a maximum diameter smaller than the maximum major diameter of the threads 3.

The axis of the shank 2 is centered in the median plane of the bit 4 between the two parallel wide faces 8. Drilling stresses, therefore, are transmitted from the bit to the shank by their abutting engagement in the slot 10. The bit 4 may be secured otherwise in the slot 10 by a relatively weak bond without interfering with proper functioning of the screw. In the embodiment of FIGS. 1 to 5, a film of adhesive, too thin to permit pictorial representation, is interposed between the faces 8 of the bit 4 and the corresponding, planar and parallel faces of the branches 12 which bound the slot 10. Other bonding methods, such as soldering, welding, or riveting, may be chosen if desired. A screw of the type discussed here normally is inserted in an object only once and remains in position thereafter over its entire useful life. It is thus sufficient that the bond between the shank 2 and the bit 4 survive the initial drilling operation. The resistance of the substrate thereafter tends to center the bit 4 on the shank 2 whose position in turn is established by the threads 3.

When a screw of the invention is to be inserted in material offering great resistance to drilling, supplemental measures are preferably taken to prevent relative movement of the bit and shank, and suitable modifications of the screw described above are shown in FIGS. 6 to 17.

The screw illustrated in FIGS. 6 to 8 has a hexagonal head 1' similar to the head 1. Its shank 2' carries threads 3 as described above and differs from the aforedescribed shank 2 only in the configuration of its axial faces in the slot 10, not specifically shown, which conformingly engage a modified bit 4'.

The wide, parallel, axial faces 8' of the bit 4' flare axially toward the associated end face sections 5 and are provided with elongated grooves 7 adjacent the respective cutting edges 6 as described above. The portion of each face 8' received in the slot carries two axially elongated, integral ribs 17 equidistant from a plane of reference through the screw axis 16 and perpendicular to the faces 8'. The ribs 17 are of equiangularly triangular cross section. When the bit 4' is inserted axially into the slot 10 of the shank 2', the ribs 17 cut corresponding axial grooves into the softer material of the shank branches, and the engaged ribs 17 and non-illustrated grooves prevent radial displacement of the bit in the slot.

While four ribs 17 have been shown in FIGS. 8 and 9, almost equally strong anchoring of the bit 4' is achieved by only one rib 17 on each face 8' if the ribs are spaced oppositely from the afore-mentioned plane of reference which includes the axis 16.

Further anchoring of the bit 4' in the slot 10 is provided by an integral projection 18 on the end face of the bit perpendicular to the axis 16. The projection 18 is elongated at right angles to the axis 16 and tapers axially toward a free, longitudinal face 19 which conformingly embeds itself in the opposite wall of the slot 10 when the bit 4' is driven home in the shank 2'. The projection 18 has been found to aid in transmitting torque from the shank 2' to the bit 4'.

The bit 4a shown in FIGS. 10 and 11 has an opening 21 in the portion thereof which is received in the slot of the associated shank 2a. After insertion of the bit in the slot, the branches 22a of the shank are partly pressed into the opening 21 from opposite sides. Their softer material conforms to the shape of the opening 21. An end face of the bit 4a perpendicular to the screw axis carries a short rib 20 having a sharp edge located in the afore-mentioned plane of reference. The rib 20, when embedded in the opposite face of the shank 2a, as indicated in FIG. 11, prevents angular displacement of the bit 4a about an axis passing through the opening 21.

The bit 4b illustrated in FIGs. 12 and 13 has a similar rib 20 for an analogous purpose. The portion 25 of the bit which is received in the slot between the branches 22b of the associated screw shank 2b is thinner than the portion 23 projecting axially from the slot. The two pairs of wide axial faces of the two bit portions are connected by respective narrow, V-shaped abutment faces 24 transverses to the screw axis, each face 24 having two elongated sections angularly offset from each other at an angle somewhat smaller than 180°. The branches 22b of the shank 2b are shaped for conforming abutting engagement with the abutment faces 24.

In the screw shank 2c seen in FIG. 14, the two branches have planar faces 27 obliquely converging toward respective straight abutment faces which engage corresponding transverse abutment faces on the bit 4c which is otherwise substantially identical with the bit 4b. The faces 27 facilitate removal of chips from the drilled hole.

The screw only partly shown in FIGS. 16 to 18 is not significantly different from that illustrated in FIGS. 1 to 5 as far as not explicitly shown and described otherwise. Its shank 2d of stainless steel receives a carbide bit 4d. The axial portion 33 of the bit outside the shank 2d and near the cutting edges is thicker than the portion received in the shank. Diametrically opposite axial edges of the latter are formed with recesses 30 which are axially elongated and circumferentially open in the direction in which the associated cutting edges 36 face. The bit 4d is secured in the shank 2d at least to a major extent by conforming engagement of the walls of the recesses 30 with lip portions 31 of the shank 2d. The lip portions 31 originally bounded the axially elongated orifice of the slot in the shank 2c and were bent out of the otherwise planar faces of the branches in the slot after insertion of the bit 4d.

In most applications of screws of this invention, the heads and, to some extent, adjacent parts of the shanks are exposed for lengthy periods to the atmosphere after installation of the screw. In general purpose screws of the invention, stainless steel therefore is the preferred material of construction. Carbide tips are most practical in the same type of screws because of their ability of drilling into most other materials of construction. At least some advantages of this invention, however, are available from combinations of other materials of which the one constituting the drill bit is harder than the material of the shank, and normally also of the head if a head is provided for turning the screw about its axis. Depending on the specific configuration of the driving tool, the head may be of any one of the types provided with a driving recess such as a transverse slot, a non-circular, axially open recess for engagement by an Allen wrench, and the like. In some instances, it may be sufficient to provide the end of the shank remote from the drill bit with a transverse slot or a hexagonal recess of the type common in set screws, and an enlarged head may be dispensed with.

It should be understood, therefore, that the foregoing disclosure relates not only to the preferred embodiments, and that it is intended to cover all changes and modifications of the examples of the invention herein chosen for the purpose of the disclosure which do not constitute departures from the spirit and scope of the invention set forth in the appended claims.

What is claimed is:

1. A hole-drilling, self-tapping screw comprising:
   (a) an elongated, threaded rod-like metallic shank member having a longitudinal axis;
   (b) driving means on one axial end portion of said shank member for turning the shank member about said axis,
      (1) the other axial end portion of said shank member being formed with an axially extending slot open at the end and along both sides of said shank member; and
   (c) a flat plate-like cutting member of a metallic material harder than the material of said shank member,
      (1) a portion of said cutting member being fixedly secured in said slot,
      (2) said cutting member projecting axially from said slot away from said other axial end portion and defining a surface of circular cross section as said shank member is turned about said axis,
      (3) the maximum diameter of said surface being smaller than the maximum major diameter of the threads on said shank, and (4) said cutting member having two wide axially extending faces and two narrow axially extending faces extending between said wide faces, the end of said cutting member spaced outwardly from said slot forming an arrow head-like cutting edge comprising a pair of straight sections each converging inwardly toward the other from a different one of said narrow faces with each said straight section forming an oblique angle with the prolongation of the longitudinal axis of said shank member, said straight sections intersecting at a line extending between said wide faces, and a groove in at least one of said wide faces extending along one of said straight sections of said cutting edge, said groove having a pair of edges disposed in generally parallel relation with one edge extending along said straight section and the other edge spaced from said one edge and extending across said wide face and said shank member within the region of said slot being deformed into mechanical interconnection with said cutting member.

2. A screw as set forth in claim 1, wherein a portion of said shank member axially adjacent said cutting member is free from threads and has a radius smaller than the maximum radial spacing of said narrow faces of said cutting member.

3. A screw as set forth in claim 1, wherein said other axial end portion is divided by said slot into two branches, each branch being formed with an axially and radially open recess communicating with said slot and extending about said axis in an arc of less than 90°, the recesses of said branches being diametrically opposite each other.

4. A screw as set forth in claim 1, wherein one of said members is formed with at least one recess, a portion of the other member being received in said at least one recess for deformably interconnecting said members to one another by deforming said shank member.

5. A screw as set forth in claim 4, wherein said one member is said shank member, and said recess is axially elongated, said cutting member carrying an axially elongated, integral rib and said shank member being deformed against said rib for forming said recess.

6. A screw as set forth in claim 1, wherein each of said wide faces carrying an integral, axially elongated rib, said ribs being oppositely spaced from a plane of reference including said axis and transverse to said faces, said shank member having two axially elongated recesses in said other axial end portion within said slot therein and respectively receiving said ribs in conforming engagement and said shank member being deformed against said ribs for forming said recesses.

7. A screw as set forth in claim 1, wherein said cutting member has an end face in said slot transverse to said axis and directed toward said one axial end portion, an integral projection on said end face tapering toward said one axial end portion and being conformingly received in said shank member by deforming said shank member.

8. A screw as set forth in claim 1, wherein said portion of said cutting member is formed with two recesses, said slot separating two branches of said other axial end portions, respective parts of said branches being deformably received in said two recesses.

9. A screw as set forth in claim 8, wherein said axially extending wide faces being formed with said recesses, said branches have respective opposite faces bounding said slot therebetween, said parts being deformably projected from said opposite faces of said branches respectively.

10. A screw as set forth in claim 11, wherein said opposite faces of said branches extend between respective axially elongated edge portions, and said parts project from said edge portions.

11. A screw as set forth in claim 12, wherein said parts are radially spaced from said axis in opposite directions.

12. A screw as set forth in claim 1, wherein said portion of the cutting member is formed with a recess, said slot separating two branches of said other axial end portion, a part of one of said branches being conformingly deformably received in said recess for securing said members to each other.

13. A screw as set forth in claim 1, wherein said members have respective abutment faces transverse to said axis outside said slot, said abutment face of said shank members being deformed into conforming engagement with said cutting member.

14. A screw as set forth in claim 13, wherein one of said abutment faces has two elongated sections angularly offset from each other at an angle smaller than 180°.

15. A screw as set forth in claim 1, wherein the material of said shank member is stainless steel, and the material of said cutting member consists essentially of a metal carbide.

* * * * *